Figure 1:
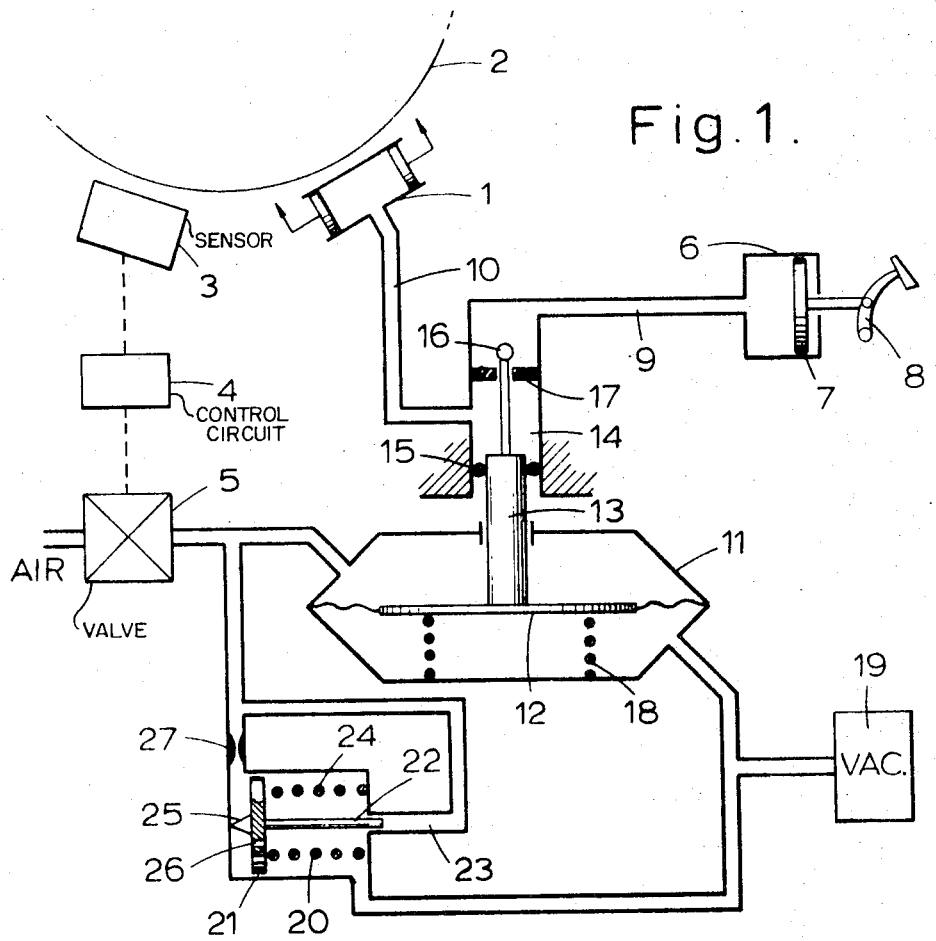

United States Patent [19]

Skoyles

[11] 3,843,212

[45] Oct. 22, 1974

[54] ANTI-LOCK VEHICLE BRAKE SYSTEMS

[75] Inventor: Derek Robert Skoyles, Salford, near Redhill, England

[73] Assignee: U.S. Philips Corporation, New York, N.Y.

[22] Filed: Apr. 12, 1973

[21] Appl. No.: 350,609

[30] Foreign Application Priority Data
Apr. 28, 1972 Great Britain.................. 19849/72

[52] U.S. Cl............................. 303/21 F, 188/181 A
[51] Int. Cl............................................... B60f 8/06
[58] Field of Search.......... 303/21 F, 21 AF, 61–63, 303/68–69; 188/181

[56] References Cited
UNITED STATES PATENTS

| 3,503,655 | 3/1970 | Heimler | 303/21 F |
| 3,708,213 | 1/1973 | Skoyles | 303/21 F |
| 3,713,708 | 1/1973 | Michellone et al. | 303/21 F |
| 3,716,275 | 2/1973 | Skoyles | 303/21 F |

Primary Examiner—Trygve M. Blix
Assistant Examiner—D. C. Butler
Attorney, Agent, or Firm—Frank R. Trifari

[57] ABSTRACT

An anti-lock brake system including a fluid pressure cutoff in fluid communication with a wheel brake. The pressure cutoff progressively increases the volume of the space available for the fluid at the wheel brake in response to the pressure differential across the fluid pressure cutoff.

4 Claims, 2 Drawing Figures

ANTI-LOCK VEHICLE BRAKE SYSTEMS

THIS INVENTION relates to anti-lock brake systems for wheeled vehicles, that is, brake systems including means for improving braking performance of a vehicle by relieving braking pressure applied to a road wheel of the vehicle if the wheel tends to lock following brake application and then increasing the braking pressure again without the need for any change in the actual braking action (by a person using the brake) causing the brake application. Such brake systems can be successful in reducing the risk of skidding due to wheel lock and in maintaining directional control during braking, and can also reduce braking distances.

In the U.S. Pat. No. 3,608,984 there is described and claimed an anti-lock vehicle brake system which includes, a fluid pressure line for connection from a fluid pressure source to a wheel brake controlled by the system, an elongate slide member arranged for longitudinal movement into a section of said line, which member is so dimensioned as to provide between itself and the inner wall of the section a clearance which forms a restricted fluid path in said section, and means for varying the extent of penetration of said slide member into said section during operation of the system to cause variation of the length of said fluid path and thus of the restriction afforded by it.

A specific form of such a system which is described is hydraulic and includes an anti-lock control valve adapted for actuation in response to an electrical output from a wheel sensor, a connection from the brake to a reservoir, which connection is adapted to be opened by said anti-lock control valve, when the latter is actuated, to allow fluid to be displaced from said brake through said connection into the reservoir, and means for controlling slide member penetration as a function of reservoir fluid volume. This specific form of system may be termed "direct acting" in the sense that on the one hand it is the actual fluid which produces braking pressure that is displaced through the opened anti-lock control valve, and on the other hand it is also this fluid which is affected by the restricted fluid path due to the location of the latter in the fluid pressure line between the fluid pressure source and the wheel brake. The effect of the restricted fluid path is to determine in accordance with the (variable) restriction afforded by it the rate at which braking pressure is re-applied following closure of the anti-lock control valve.

It is an object of the present invention to provide an "indirect acting" form of anti-lock vehicle brake system in which a restricted fluid path, preferably of the type set forth above having an elongate slide member arranged for longitudinal movement into a section of a fluid connection, is provided to achieve the same effect. By "indirect acting" is meant a system in which the actual fluid that produces braking pressure is not itself displaced through an opened anti-lock control valve to relieve braking pressure, but instead has its pressure modified by means of a servo mechanism which is responsive to fluid pressure change in an auxiliary system which is controlled by an anti-lock control valve.

According to the present invention there is provided an anti-lock vehicle brake system comprising, a fluid pressure source, a fluid pressure line connected between said source and a wheel brake, fluid pressure cut-off means located in said line and effective on displacement to provide a fluid pressure seal between the source and the brake and also to increase progressively the volume of the space available for fluid at the brake side of the seal so that fluid pressure at the brake is reduced, a servo mechanism having a diaphragm to which said cut-off means is connected and which is displaceable in response to a fluid pressure difference across it to cause the displacement of said cut-off means, an anti-lock control valve adapted for actuation in response to an output from a wheel movement sensor, a first connection from said servo mechanism, which first connection is adapted to be opened by said anti-lock control valve, when the latter is actuated, to cause said fluid pressure difference across said diaphragm, and a second connection including a restricted fluid path through which fluid pressure at opposite sides of said diaphragm is equalised, at a rate determined by the restriction afforded by said path, when the anti-lock control valve is re-closed following opening thereof.

Preferably, said restricted fluid path comprises an elongate slide member arranged for longitudinal movement into a section of said second connection, which member is so dimensioned as to provide between itself and the inner wall of the section a clearance which forms said restricted fluid path, together with operating means for varying the extent of penetration of said slide member into said section during operation of the system to cause variation of the length of said fluid path and thus of the restriction afforded by it. Suitably, said operating means comprises a piston to which said slide member is attached and which is displaceable to cause said penetration of said slide member in response to substantially the same fluid pressure difference across it as that to which said diaphragm is subjected, the magnitude of said difference determining the extent of slide member penetration.

In a preferred embodiment of the invention, said servo mechanism is a vacuum servo and actuation of the anti-lock control valve exhausts to atmosphere one side of said diaphragm to cause said fluid pressure difference across the diaphragm, a vacuum source being connected to said second connection for maintaining a vacuum at both sides of said diaphragm when the anti-lock control valve is closed.

Figure 2:
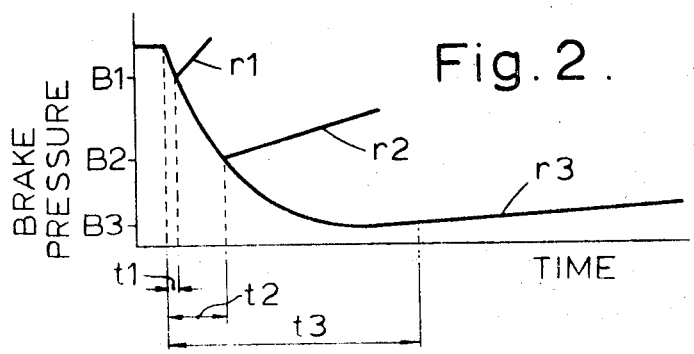

In order that the invention may be more fully understood reference will now be made by way of example to the accompanying drawing of which:

FIG. 1 is a schematic block diagram of an anti-lock vehicle brake system according to the invention; and FIG. 2 shows a brake pressure/time curve for the system of FIG. 1.

Referring to FIG. 1, the anti-lock vehicle brake system there shown comprises a wheel brake 1 for a vehicle wheel 2, a wheel movement sensor 3, an electrical control circuit 4, an anti-lock control valve 5, and a master cylinder 6 having a piston 7 which is actuable by a brake pedal 8. Although not shown, the master cylinder 6 may be servo-assisted.

In operation of the system for normal brake application, fluid in pressure lines 9 and 10 is pressurized by the master cylinder 6 to an extent determined by a driver's braking action and this produces a corresponding braking pressure in the brake 1. If the driver's braking action is likely to cause skidding due to the wheel locking, this is detected by the wheel movement sensor 3 and the control circuit 4, and the latter actuates the anti-lock control valve 5. Details of the manner of operation and composition of the elements 3, 4 and 5 are not thought to be necessary for an understanding of the present invention, but an example of the form which these elements might take and their manner of operation is given in the U.S. Pat. No. 3,710,186.

The system further includes a vacuum servo amplifier 11 which houses a diaphragm 12. The diaphragm 12 carries a piston 13 which extends through the wall of the diaphragm housing in a sealing and sliding manner and into a bore 14. An O-ring 15 provided on the piston 13 provides a sealing engagement between the piston 13 and the wall of the bore 14. The end of the piston 13 carries a supply valve 16 which is adapted to seal an orifice 17. There is provided in the diaphragm housing a spring 18 which engages the diaphragm 12 to urge it upwardly (as seen in the drawing), so that the valve 16 is displaced from its seating in orifice 17, as shown. In this position of the valve 16, fluid pressure from the master cylinder 6 can pass between pressure lines 9 and 10 to actuate the brake 1, as aforesaid.

A vacuum source 19 extends a vacuum to both sides of the diaphragm 12. When the anti-lock control valve 5 is actuated, the housing at the upper side of the diaphragm 12 is opened to atmosphere, with the result that the diaphragm 12 is displaced against the spring 18 so that the piston 13 carried on the diaphragm is also displaced to seal the valve 16 in the orifice 17 and thereby isolate the master cylinder 6 from the brake 1. There is an immediate relieving of braking pressure because displacement of the piston 13 increases the available volume of the bore 14 to the fluid in pressure line 10 and the bore 14. The braking pressure thereafter progressively reduces due to further displacement of the diaphragm 12 and thus the piston 13 as air through the opened valve 5 progressively replaces the vacuum at the upper side of the diaphragm 12.

The system also icludes a chamber 20 in which a spring-loaded piston 21 is slideably accommodated. This piston 21 carries an elongate slide member or restrictor 22 which enters a connection 23 when the piston 21 is displaced to the right (as seen in the drawing) against its spring-loading. The restrictor 22 is so dimensioned with respect to the connection 23 as to provide between itself and the inner wall of this connection 23 a clearance which forms a restricted fluid path. The spring-loading of the piston 21 is provided by a spring 24.

Normally (i.e., when the anti-lock control valve 5 is unactuated), vacuum exists at both sides of the piston 21 so that the latter is urged to the left by the spring 24. In this position, a projection 25 on the piston 21 abuts the end wall of the chamber 20 and the restrictor 22 is just penetrating the connection 23. When the valve 5 is actuated, air at atmospheric pressure acts behind the piston 21 to displace it to the right so that the restrictor 22 penetrates further into the connection 23. This displacement is progressive as the air gradually replaces the vacuum behind the piston 21, so that the extent of penetration of the restrictor 22 into the connection 23 will be dependent on the length of time that the valve 5 remains actuated. This length of time is determined by the control circuit 4 in dependence on the time taken by the wheel 2 to recover free rolling speed following the relieving of braking pressure. For a road surface with good adhesion the wheel will recover more quickly than for a slippery road surface. Also, the extent to which braking pressure is relieved will be less for a road surface with good adhesion than for a slippery road surface due to the progressive displacement of piston 13 whilst the valve 5 is actuated.

When the anti-lock control valve 5 is subsequently closed, vacuum will build-up again at both sides of the diaphragm 12 until the supply valve 16 unseats from the orifice 17 to restore normal braking conditions. During this build-up, the diaphragm 12 is displaced progressively upwards so that braking pressure is increased by piston 13 reducing the volume of connection 10 and bore 14 that is available for the fluid at the brake side of the supply valve 16. For this build-up of vacuum, air in the system has to pass primarily through connection 23 to the vacuum source 19, so that this build-up, and thus the rate at which braking pressure is restored, is controlled by the restricted fluid path afforded by restrictor 22 and connection 23. The restriction of this path is a function of the actuation time of the valve 5, so that for road surfaces with good adhesion for which this actuation time is short, braking pressure is restored at a relatively high rate from a relatively high value, whereas for road surfaces with poor adhesion for which this actuation time is longer, braking pressure is restored at a slower rate from a lower value. Three examples of this are given in FIG. 2 for three different actuation times $t1$, $t2$ and $t3$ which result in rate slopes $r1$, $r2$ and $r3$ from relieved braking pressure levels B1, B2, B3.

A narrow bore 26 communicates with opposite sides of the piston 21. This bore is provided to allow air behind the piston 21 to pass eventually to the vacuum source 19 when the system is exhausted following closure of the valve 5. Also, a fixed restriction 27 is provided to limit flow rate of air to piston 21.

A system as described above may be provided in respect of each road wheel of a vehicle, using a single master cylinder as a common source of fluid pressure and a common vacuum source.

What we claim is:

1. An anti-lock vehicle brake system comprising, a fluid pressure source, a fluid pressure line connected between said source and a wheel brake, fluid pressure cut-off means located in said line and effective on displacement to provide a fluid pressure seal between the source and the brake and also to increase progressively the volume of the space available for fluid at the brake side of the seal so that fluid pressure at the brake is reduced, a servo mechanism having a diaphragm to which said cut-off means is connected and which is displaceable in response to a fluid pressure difference across it to cause the displacement of said cut-off means, an anti-lock control valve adapted for actuation in response to an output from a wheel movement sensor, a first connection from said servo mechanism, which first connection is adapted to be opened by said anti-lock control valve, when the latter is actuated, to cause said fluid pressure difference across said diaphragm, and a second connection including a restricted fluid path through which fluid pressure at opposite sides of said diaphragm is equalized, at a rate determined by the restriction afforded by said path, when the anti-lock control valve is re-closed following opening thereof.

2. A system as claimed in claim 1, wherein said restricted fluid path comprises an elongate slide member arranged for longitudinal movement into a section of said second connection, which member is so dimensioned as to provide between itself and the inner wall of the section a clearance which forms said restricted fluid path, together with operating means for varying the extent of penetration of said slide member into said section during operation of the system to cause variation of the length of said fluid path and thus of the restriction afforded by it.

3. A system as claimed in claim 2, wherein said operating means comprises a piston to which said slide member is attached and which is displaceable to cause said penetration of said slide member in response to substantially the same fluid pressure difference across it as that to which said diaphragm is subjected, the magnitude of said difference determining the extent of slide member penetration.

4. A system as claimed in claim 3, wherein said servo mechanism is a vacuum servo and actuation of the anti-lock control valve exhausts to atmosphere one side of said diaphragm to cause said fluid pressure difference across the diaphragm, a vacuum source being connected to said second connection for maintaining a vacuum at both sides of said diaphragm when the anti-lock control valve is closed.

* * * * *